Nov. 27, 1956    F. TORWEGGE ET AL    2,771,923
VENEER JOINING MACHINE
Filed May 19, 1953    4 Sheets-Sheet 1
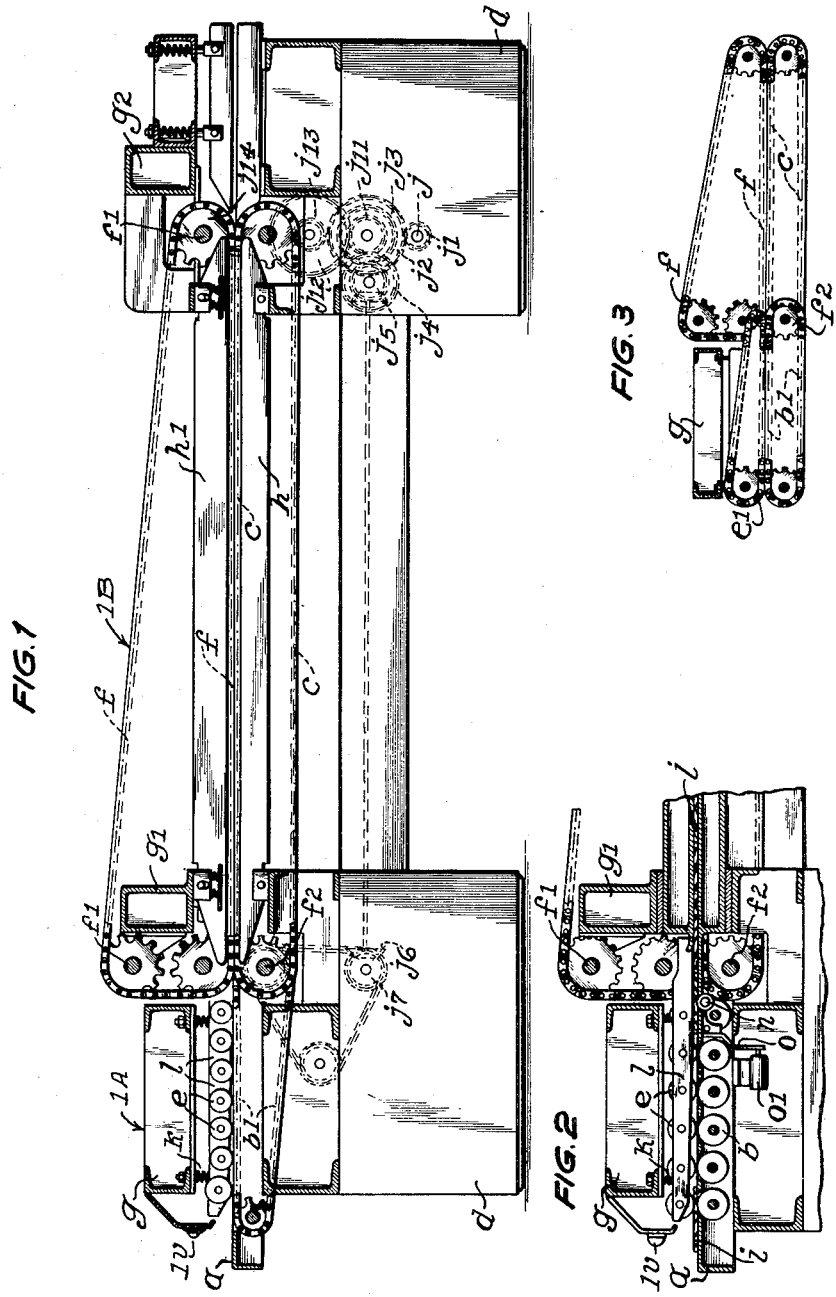
INVENTORS
F. Torwegge
K. Maschmeyer
By Bryant & Lowry
ATTYS.

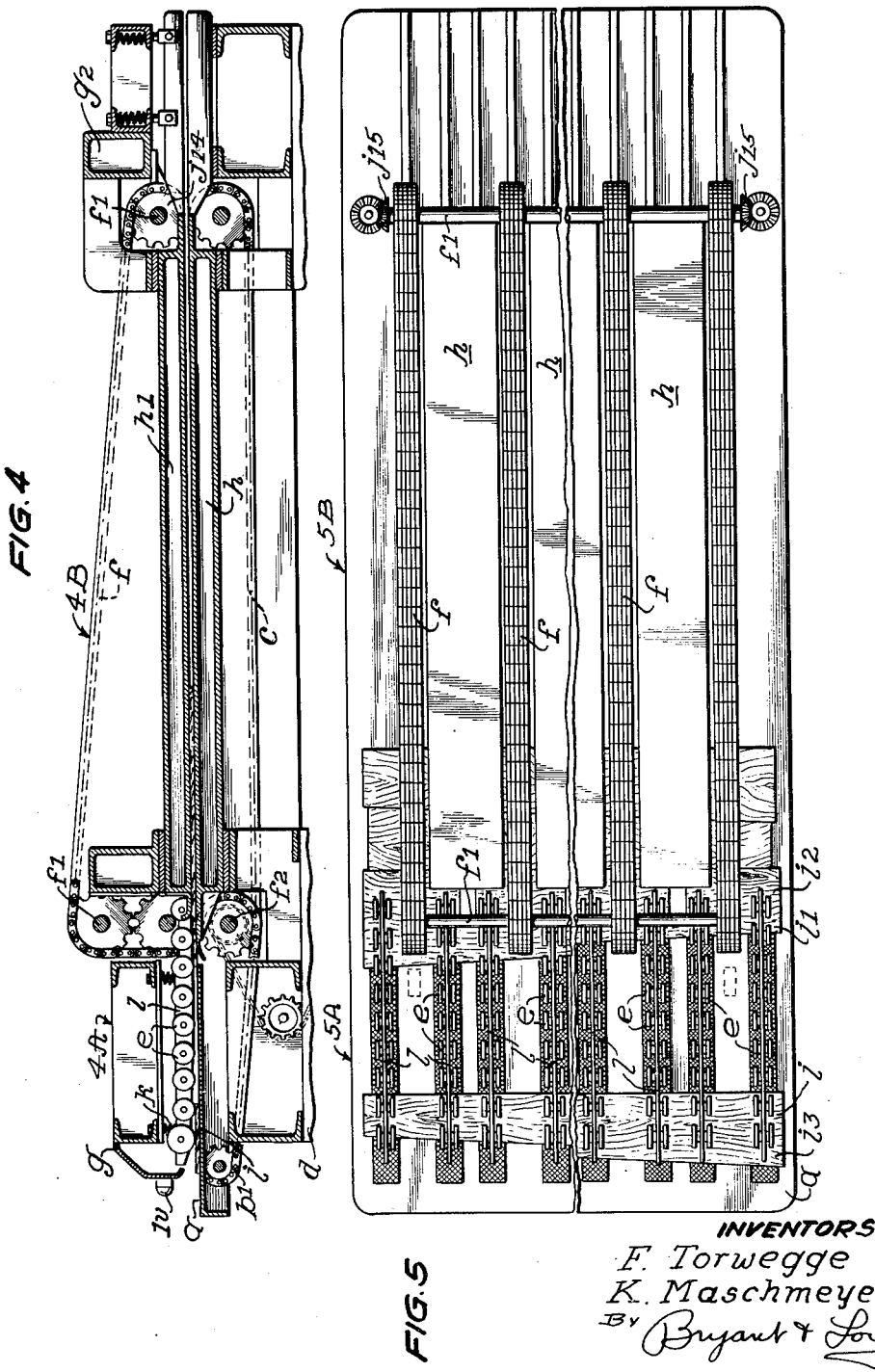

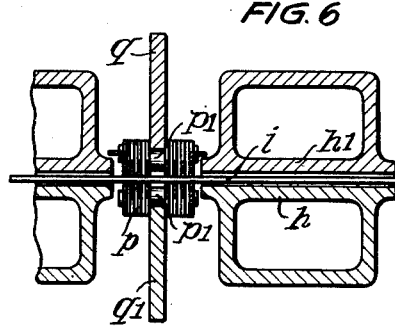
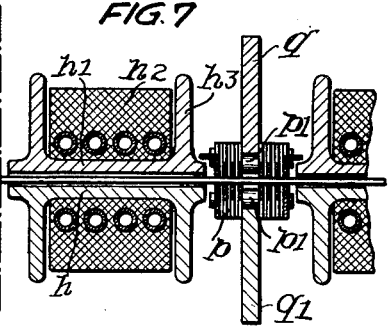
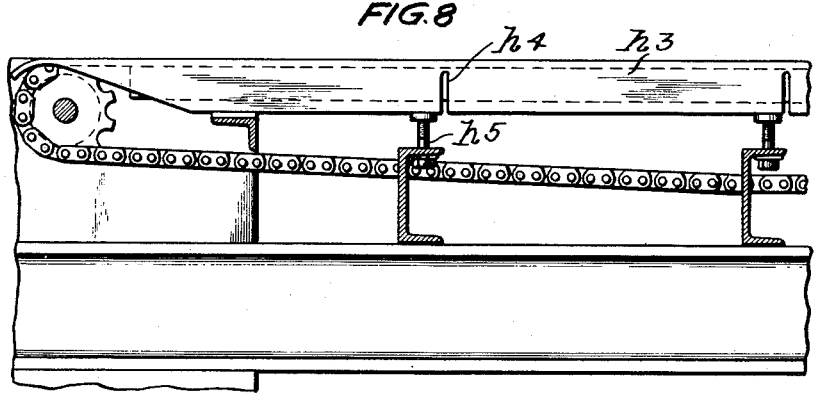
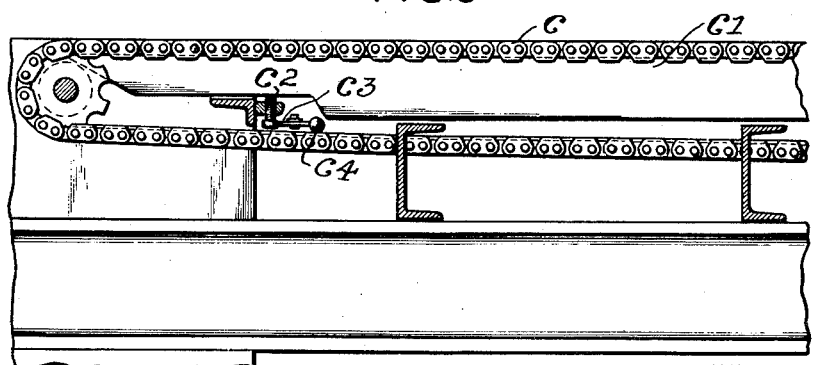

Nov. 27, 1956

F. TORWEGGE ET AL 2,771,923

VENEER JOINING MACHINE

Filed May 19, 1953

INVENTORS
F. Torwegge
K. Maschmeyer
By Bryant & Lowry
ATTYS

United States Patent Office 2,771,923
Patented Nov. 27, 1956

2,771,923

VENEER JOINING MACHINE

Franz Torwegge, Bad Oeynhausen-Melbergen, and Karl Maschmeyer, Gohfeld Kreis Herford, Westphalia, Germany, assignors to Franz Torwegge Maschinenfabrik, Bad Oeynhausen-Melbergen, Germany, a firm Application May 19, 1953, Serial No. 355,936

Claims priority, application Germany May 23, 1952

5 Claims. (Cl. 144—279)

This invention relates to wood gluing machines, and more particularly to a machine for joining veneers across their grain.

Machines for joining veneers, especially such where they are joined along their grain or across their grain, are well-known in the art.

Hitherto, the veneer strips have been joined together along their edges either by means of convergently driven chains or rollers urging the edges together or by being placed side by side and fed in their longitudinal direction between a pair of grooved pressure rollers. However, the known embodiments are disadvantageous in that on the one hand they do not firmly contact one another along their butted edges, and on the other hand they are often pushed on top of one another on account of too high a feed speed, which obviously lowers the efficiency of such machines. It happens quite often that for these reasons the veneers have to be subjected to time-consuming repair which not only is bothersome and annoying but also rather expensive.

With such machines it is of utmost importance that the veneer strips closely abutted along their edges are fed to the conveyor belts in a reliable manner.

It is one object of the invention to eliminate these disadvantages in a simple and reliable manner by having the veneer prior to their being fed to the actual conveying mechanism firmly and uniformly butt-joined by means of laterally spaced pressure rollers after automatic compensation of dimensional differences in width along the length of the successive veneer strips to be joined and in this state fed to the conveying means for subsequent gluing. In order to have the butt edges of the veneers form a close joint, contact rollers are provided which control the speed of the conveyor belt independently of the width variations in the strips.

With heavily warped veneer strips the mechanical contact rollers are liable to provide faulty control. This is the case when the warped portions are very short and stiff, causing the contact rollers not to be pressed down uniformly when going over these portions.

It is a further object of the invention to remedy this disadvantage. This is accomplished in a very simple and reliable manner by employing light-ray control or by incorporating photo-electric cells.

Other objects and features which we believe to be characteristic of the invention are set forth with particularity in the appended claims. The invention itself, however, both as to manner of construction and method of operation, together with further objects and advantages thereof may best be understood by reference to the following description taken in connection with the accompanying drawings, in which:

Fig. 1 is a side elevational view of a veneer strip joining machine, partly in section;

Fig. 2 shows a modified feeding equipment of the machine, partly in section;

Fig. 3 shows a further modified feeding and conveying equipment of the machine, partly in section;

Fig. 4 is a side elevational view of the veneer joining machine, partly in section, with inserted veneer strips;

Fig. 5 is a top plan view of the veneer strip joining machine;

Fig. 6 is a partial vertical section of the upper and the lower heating devices on an enlarged scale;

Fig. 7 is a partial vertical section of the upper and the lower heating devices of modified form on an enlarged scale;

Fig. 8 is a side elevational view of the veneer strip joining machine, partly in section, showing the outside of the heating means;

Fig. 9 shows the endless chain conveyor with height adjustment of the rails for the chains;

Figure 10:
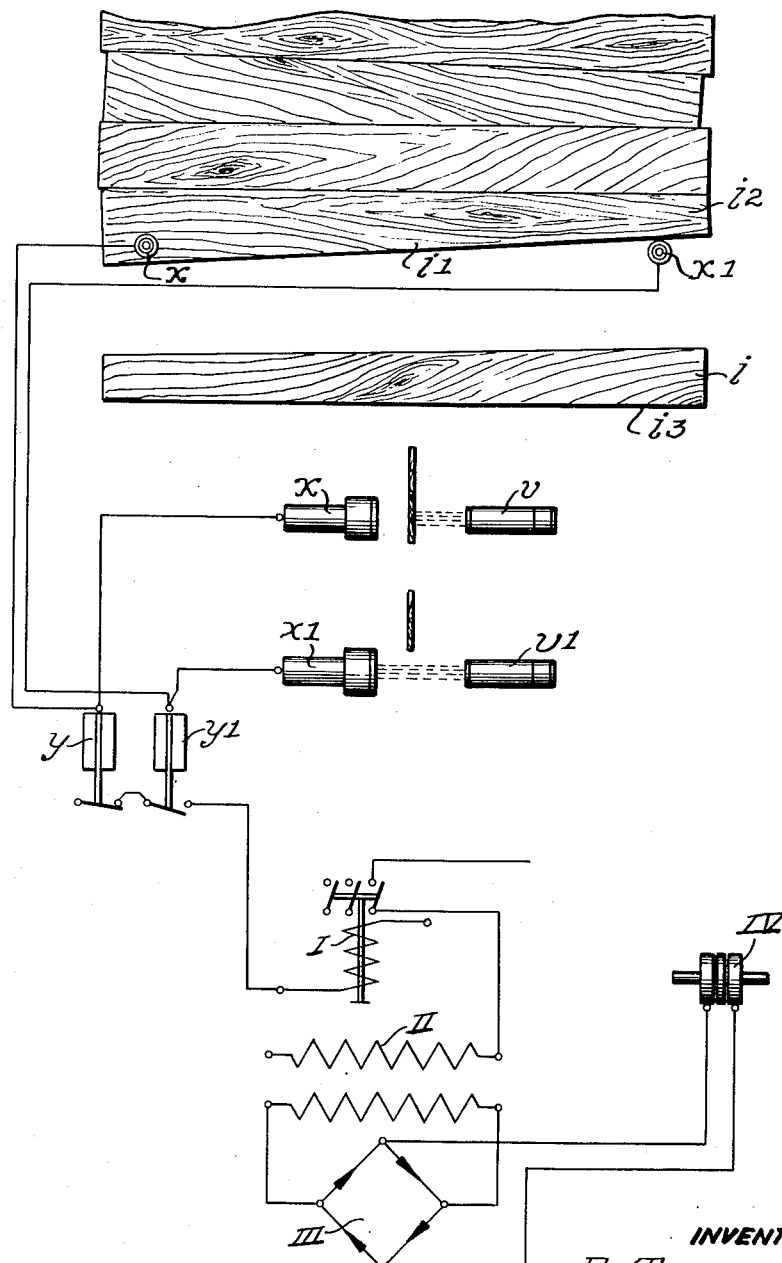
Fig. 10 is a top plan view of a light ray control device and a wiring diagram of the same.

Referring now more specifically to the drawings, the machine for joining veneer strips across their grain in the form as illustrated in Fig. 1 employs veneer feeding equipment 1A and conveying mechanism 1B, said feeding equipment is suitably and essentially provided with a table $a$, lower pressure rollers $b$, an endless lower chain conveyor $c$, a support $d$, means for the drive and drive transmission, pressure rollers $e$ constituting the upper part of the feeding machine, an endless upper chain conveyor $f$, supporting structures $g$, $g^1$, $g^2$, and heating plates $h$, $h^1$ incorporated between the adjacent chain conveyors.

The veneer strip $i$ is placed upon table $a$ with its glue-applied long edge first and then fed forward.

Instead of the lower pressure rollers $b$ and the upper pressure rollers $e$ as shown in Fig. 2, lower chains $b^1$ and upper chains $e^1$ as shown in Fig. 3, may be provided.

Preferably, lower counter chains $b^1$ co-acting with upper rollers $e$ as indicated in 1A of Fig. 1 may often be used instead.

Pressure rollers $b$ beneath table $a$ in Fig. 2 are driven, for example, by means of a variable speed feed transmission from a shaft $j$, operating bevel gears $j^4$, $j^5$, $j^6$, and $j^7$ through the medium of gear wheels $j^1$, $j^2$, and $j^3$, said bevel gears being in operative engagement with pressure rollers $b$ by means of a chain drive. Pressure rollers $e$ located above pressure rollers $b$ are supported by springs $k$ or the like, which are mounted upon the top of the supporting structure $g$. This top is vertically adjustable, enabling the pressure of upper rollers $e$ upon the lower rollers $b$ to be variable. Between adjacent rows of said upper pressure rollers $e$ there are guiding boards $l$ of such shape and arrangement that a small clearance is provided between guiding board $l$ and table $a$ which gradually diminishes forwardly and which has the approximate height of the veneer strip thickness.

The upper pressure rollers $e$ or upper chains $e^1$, respectively, can also be driven similar to and by similar means as the upper chain conveyor $f$ and the lower pressure rollers $b$ or lower chains $b^1$, respectively; this is of special advantage with warped veneer strips.

The supporting structure $g$, upon which are mounted upper pressure rollers $e$ and guiding boards $l$, is vertically adjustable by hand or by any gearing not shown in the drawing.

The veneer strip $i$ inserted between pressure rollers $b$ and $e$ is guided to the rear edge $i^1$ of a veneer strip $i^2$, as shown in Fig. 5. The result is a gradual reduction in the spacing between the strips which, regardless of whether or not the leading edge of veneer strip $i$ is parallel to the rollers' axes, closes parallel to the training edge $i$ of the preceding veneer $i^2$. At this point contact roller $n$, which has moved off said trailing edge into this spacing beneath a guiding board $l$, is pressed down by the new veneer strip $i$ and by means of lever $o$, operates contact switch $o^1$ which by way of a contactor I transmits an electric impulse to a magnetic coupling IV mounted between gear wheels $j^2$ and $j^{11}$.

By means of this magnetic coupling the endless lower chain conveyor $c$ is driven by way of gear wheels $j^{12}$, $j^{13}$, and $j^{14}$, and endless upper chain conveyor $f$ by way of shaft $f^1$ and outer bevel gears $j^{15}$, both conveyors being driven with the same speed. Chains $c$ and $f$ are, e. g., sprocket chains $p$, as shown in Fig. 6, which are supported together with their rollers $p^1$ by rails $q$, $q^1$. These rails are spring-supported. Between chain conveyors $c$ and $f$ there are located heating plates $h$, $h^1$, which are spaced from each other so as to leave only the necessary space for the veneer strips moving therebetween. By this means even heavily warped veneer strips are straightened and absolutely joint-tight glued together. The veneer strips are fed into the feeding means with wet glue on their butting edges, and this glued joint is subsequently dried during passage between the conveyors.

The supporting structures $g^1$, $g^2$, to which are mounted the chain bearings, the rails, and heating plates, are vertically adjustable and in a similar manner by means of the same gearing which operates the vertical adjustability of the supporting structure $g$.

The feed speed of pressure rollers $b$ being about one-fifth greater than the feed speed of the endless chain conveyors $c$, $f$, the spacing between the two approaching veneer strips gradually closes before their joint comes in contact with said conveyor chains. If contact roller $n$ or the opposite contact roller rolls off a rear edge $i^3$ of veneer strip $i$, i. e., off the narrow end of the possibly tapered veneer strip, the magnetic coupling is released and the gearing elements $j$, $j^1$, etc. uncoupled for the drive of the upper and lower conveyor chains.

To facilitate feeding conical tapered veneer strips an indicating device has been provided which indicates the inclination of the trailing edge of the last veneer strip enabling the operator to ascertain how to feed the following veneer strip or when to turn them over, if necessary.

The indicating device preferably consists of one or more signal lamps $w$ connected to contact rollers which indicate which of the two rollers is no longer in contact with the veneer strips, or which end of the last veneer strip is farthest back. In the case of heavily warped veneer strips the smooth feeding and conveying of same to said rollers may lead to difficulties. In order to avoid this, similar or short chains such as are being employed for conveying the veneer strips through the heating plates may be incorporated instead of the guiding boards $l$.

In such a case corresponding counter chains should be provided instead of the lower pressure rollers, and these lower chains should preferably be driven by the lower front shaft $f^2$, as shown in Fig. 2, while the upper rollers simply operate as pressure rollers without a drive of their own.

These upper pressure rollers, however, can also be driven by the lower front shaft $f^2$.

Fig. 1 illustrates a veneer feeding equipment provided with conveyor belt $b^1$, a caterpillar chain or the like, and an upper train of pressure rollers $e$, which may also be driven, if necessary. The drive is by means of the lower front shaft $f^2$.

According to another embodiment of the invention, as illustrated in Fig. 10, the contact rollers $n$ may be replaced by light ray transmitters $v$, $v^1$ mounted beneath the veneer track, and photo-electric cells $x$, $x^1$ above said light ray transmitters.

When during operation of the machine the inserted strip $i$ contacts the rear edge $i^1$ of a strip $i^2$ the right-handed photo-electric cell receiver $x^1$ is covered sending an electric impulse to relay $y^1$ of the control equipment and, thereby, closing a contact switch.

The contact switch of the left relay $y$ being closed, as seen in Fig. 10, and the photo-electric cell $x$ having previously been covered by the veneer, contactor I is electrically actuated causing same to operate and to switch-on the feeding mechanism by means of transformer II and rectifier III, whereby the rear chain continues to move chain conveyor $f$ as shown in Fig. 1.

If either photo-electric cell, or even both, which consist of the light ray transmitters $v$, $v^1$ and the receivers $x$, $x^1$, are released by the rear edge $i^3$, i. e., are exposed to light, the relevant relay, or both, are disconnected from the control mechanism, and the movement of the conveyor $f$ is interrupted.

As shown in the drawing, light ray control not only guarantees absolutely reliable conveying but also a uniformly close contact of the butt edges of the veneer strips.

Undesirable interruptions during operation due to failure of the control mechanism are practically impossible.

The output of this machine is about four times the output of the veneer joining machines of a prior art.

Various changes, modifications and supplemental arrangements may be made in the veneer strip joining machine without departing from the spirit and the scope of this invention.

For instance:

In order to prevent warping of the veneers by the one-sided contact heat resulting from the action of electric heating elements $h^2$, high walls $h^3$ of the U-shaped heating plates $h$, $h^1$ are provided with slots $h^4$ spaced from each other. The heating plates $h$, $h^1$ are supported by set screws $h^5$ mounted to the right or left of these slots $h^4$. This arrangement is possible for the upper and the lower heating devices and will result in a perfectly uniform heating surface.

Rails, e. g., $c^1$ for the lower, but also for the upper conveyor chains, $c$, for example, are spring-supported according to the present invention. When joining heavily warped veneer strips it is of special advantage when chain conveyors $f$ or $c$ can be adjusted to a level above the surface of the heating plates $h^1$ or $h$ to enable the veneers $i$ to pass therebetween in a reliable manner.

Rails $c^1$ are vertically adjustable by set screws $c^2$ which are mounted in the supporting structures and are provided with a lever $c^3$ at their heads. These levers are connected to each other by a draw bar $c^4$ running across and beneath the machine. The outer end of this draw bar is provided with a handle by means of which all rails can be centrally vertically adjusted.

The veneer strips onto the forward edges of which glue has been applied prior to their being placed on table $a$ of feeding equipment 1A, are only butted in that equipment 1A, but while traveling through the heated conveying and pressing means 1B, the glue in the joints is set. The veneer strips $i$ are fed individually and are guided and wedged at their leading edges between the conveyor rolls $e$ and $b$ or their equivalent such as chains $b'$ and $e'$, as they approach the feed-in end of the heated conveying and pressing means 1B to flatten the strips. The strips are fed faster than the conveyor mechanism 1B. It will be realized that should the leading edge of a newly fed strip be out of parallelism with the trailing edge of the last fed strip, such leading edge will be swung into parallel with such trailing edge due to the pressing down of the trip lever $o$ by the veneer adjacent thereto so as to operate switch $o'$ which controls the magnetic coupling IV as previously described between the driving means of the conveyor mechanism and of the feed-in mechanism to render said conveyor mechanism driving means operative until said newly fed strip has passed into the feed end of said conveyor mechanism and a new unclosed gap is formed behind it.

We claim:

1. In a veneer joining machine, a continuous veneer sheet conveyor having pressure and heating means for said sheet, a feeding table having laterally spaced continuously running friction feeding means for feeding veneer strips individually placed thereacross to the feed-in end of said conveyor, yieldably biased guide means over said table for wedging the leading edges of said individual strips as they approach said feed-in end and the exposed trailing edge of the last fed veneer strip so as to flatten said leading edges into alignment with said trailing edge, clutch means in said reduction gearing drive, and means responsive to the movement of said leading edges into closing relation with said trailing edge at said feed-in end for operating said clutch means until a new trailing edge enters said feed-in end.

2. In a veneer joining machine, a driven veneer sheet conveyor having pressure and heating means for said sheet, a feeding table having feeding means for feeding veneer strips individually placed thereacross to the feed-in end of said conveyor, guide means over said table for wedging the leading edges of said individual strips as they approach said feed-in end and the exposed trailing edge of the last fed veener strip so as to flatten said leading edges into alignment with said trailing edge, operating means for said conveyor, and mechanism connected to said opearting means and engaged by the leading edges of the strips to force a leading edge of a strip into closing relation with a trailing edge of a preceding strip at said feed-in end to control the relative operation of the conveyor and feeding means.

3. A veneer joining machine according to claim 2 wherein the feeding means comprises a feed-in conveyor element and a series of pressure rollers coacting with and disposed above said feed-in conveyor element.

4. A veneer joining machine according to claim 2 wherein said mechanism has photoelectric means controlled by the presence or absence of a strip to operatively connect and disconnect said mechanism in the control of said relative operation of the conveyor and feeding means.

5. A veneer joining machine according to claim 2 wherein said mechanism has an electric circuit provided with photoelectric means controlled by the presence or absence of a strip, a switch in said circuit for said photoelectric means, and a trip mechanism to actuate said switch located at the feed-in end of said conveyor and controlled by engagement of a strip therewith as it approaches said feed-in end.

References Cited in the file of this patent

UNITED STATES PATENTS

| Number | Name | Date |
|---|---|---|
| 921,618 | Murdoch | May 11, 1909 |
| 1,693,606 | Jones | Dec. 4, 1928 |
| 1,702,185 | Weber | Feb. 12, 1929 |
| 2,251,306 | Thompson | Aug. 5, 1941 |
| 2,269,816 | Gustin | Jan. 13, 1942 |
| 2,290,762 | Miller | July 21, 1942 |
| 2,366,588 | Bolling | Jan. 2, 1945 |
| 2,408,064 | Hall | Sept. 24, 1946 |
| 2,488,759 | Bolling | Nov. 22, 1949 |